United States Patent Office 3,368,878
Patented Feb. 13, 1968

3,368,878
POLYMERS DERIVED FROM METAL DECA-BORATES AND DODECABORATES
Boynton Graham, Wilmington, Del., assignor to E. I. du Pont de Nemours and Company, Wilmington, Del., a corporation of Delaware
No Drawing. Filed Aug. 14, 1964, Ser. No. 389,790
15 Claims. (Cl. 23—361)

ABSTRACT OF THE DISCLOSURE

When anhydrous metal salts of $B_{10}$ and $B_{12}$ polyhedral borates are heated, insoluble polymers are formed wherein the polyhedral borane cages are linked by B—B bonds. The insoluble polyborates can be hydrolyzed to soluble polymers which can be cast into films.

---

This invention relates to polymers obtained from polyhedral borane salts. More specifically, it concerns ionic polymers prepared by the thermal polymerization of decaborate and dodecaborate salts.

With the discovery of the polyhedral borane anions $B_{10}H_{10}^=$ and $B_{12}H_{12}^=$ and their substitution derivatives [Knoth et al., J. Am. Chem. Soc., 84, 1056 (1962)], interest in preparing polymers containing the anion in the recurring structural unit of a polymer arose.

The polymers of this invention consist essentially of recurring units of divalently anionic polyhedral dodecaborate cages or decaborate cages, or both, linked through direct boron-boron bonds to other such cages. The boron atoms of each unit not directly linked to boron of another cage are bonded to water-stable groups that can bond to carbon of an aromatic ring. The anionic charge on each cage is satisfied by a cationic moiety.

The structural formula of the recurring units of the polymer can be represented as (1) 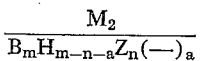

where M is one equivalent of a cation; $m$ is 10 or 12; Z is bonded to boron of the boron cage and is a monovalent group capable of bonding to carbon of an aromatic ring by replacing hydrogen; $n$ is a cardinal number of from 0 to $m-2$; (—) representing a linking bond which links the polyhedral polyborate cages and is explained in greater detail below; and $a$ represents the number of linking bonds present and is a cardinal number of from 2 to 6; $a+n$ being no greater than $m$. When two or more Z groups are present, they may be the same or different.

The initial polymers of this invention may be prepared by heating in an open system, preferably in a vacuum or an inert atmosphere, a metal salt of a polyhedral decaborate, dodecaborate, or a mixture thereof, to obtain polymers of this invention. Upon further treatment of the initially obtained polymers with solvolysis agents, and, if desired, cation-exchange agents and reactants that introduce Z groups, the preferred polymers of this invention are obtained.

Initially, polymers of this invention are prepared by heating an anhydrous metal salt of a polyhedral decaborate or dodecaborate of the formula (2) $\qquad M'_2B_mH_{m-n}Z'_n$ wherein M' is one equivalent of a metallic cation; Z' is a substituent bonded to boron of the boron cage and can be hydroxyl, carboxy, halogen (fluorine, chlorine, bromine or iodine), amino, alkyl of up to 12 carbon atoms, alkoxy of up to 12 carbons, alkylthio of up to 12 carbons, and the like; $m$ is either 10 or 12; $n$ is a cardinal number of from 0 to $m-2$. Preferably, Z' is halogen, but most preferably, $n$ is zero. Because of ease of preparation, especially when Z' is other than halogen, $n$ when other than zero is preferably at most 2.

Exemplary of Z' when it is alkyl are ethyl, isopentyl, hexyl, undecyl and 1-methylbutyl. When Z' is alkoxy, it is exemplified by isobutoxy, pentyloxy, 2-ethylhexyloxy and dodecyloxy. Representative of Z' when it is alkylthio are ethylthio, isopropylthio, hexylthio, decylthio and 1-methylheptylthio.

The resulting polymer is believed to be formed by the breaking of at least two B—H bonds in the boron cage of the monomer, leaving B— reaction sites. These reaction sites on the boron cage react with identically formed reaction sites on other boron cages to form B—B linkages in which each boron atom represents a boron from a different cage.

Thus, the recurring cage unit of the resulting polymer must have at least two of the cage boron atoms attached to boron from different cages, i.e., a recurring structure represented as —$B_m$cage—. Since each B—H bond of the cage is a potential reaction site, theoretically each boron cage could be linked to $m$ number of other boron cages (when $n$ is zero). Practically, each boron cage is linked to no more than six other boron cages, and the average number in the initially obtained polymers is usually about four.

Thus, the formula for the average recurring structural cage unit of the polymers of this invention obtained initially can be written as (3) 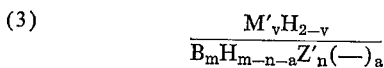

wherein Z', $m$, $a$, (—), M', and $n$ are as previously defined; and $v$ represents a number of from 0 to 2.

During the heating, a portion of the metal cation, M', is sometimes converted to the free metal. This portion of the metal lost is replaced by hydrogen cation, hence $v$ represents numerical values of from 0 to 2.

The initial polymers of this invention having the recurring structure of Formula 3 are prepared by heating an anhydrous monomer of the structure shown in Formula 2 at a temperature of between about 350° C. to 800° C. in an open system. The polymerization is accompanied by the evolution of hydrogen, and the optimum reaction temperature is one in which the gaseous hydrogen is evolved at a convenient rate.

The reaction is carried out in an open system, and all gases evolved may be removed continuously by carrying out the reaction in a vacuum, in a flowing stream of air or nitrogen, or simply in an unrestricted environment such as a hot oven.

Normally, the heating is carried out until the evolution of gases is completed.

The polymer formed is an infusible, insoluble solid. It is ordinarily washed with water, filtered and dried. When so washed, water of solvation associates with the polymer, presumably at least in part with cationic portion.

The polymer so obtained may be solubilized by a solvolysis process to prepare the preferred polymers of this invention. The solvolysis agents used include water, aqueous solutions of inorganic bases, alkylamines, amides, alkylamides and dialkylamides of formic acid and lower alkanoic acids, and dialkyl sulfoxides, in which the alkyl groups recited are preferably lower alkyl, and aqueous mineral acids. Examples of solvolysis agents are ammonium hydroxide, sodium hydroxide, potassium hydroxide, barium hydroxide, calcium hydroxide, triethylamine, isopropylamine, dimethylamine, diethylformamide, dimethylacetamide, dipropylacetamide, dimethylpropionamide, and diethyl sulfoxide. The solvolysis step is carried out at temperatures ranging from 50° to 130° C. It is most conveniently performed in an open system at atmospheric pressure, although super- or subatmospheric pressures may be employed.

The solvolysis step is believed to affect the insoluble polymers in two ways: Firstly, B—B linking bonds are broken, reducing the number of crosslinks. This results in a product in which any one of the boron cages in the polymer is linked to an average of only two other cages. Secondly, the broken B—B linkages form B—OH groups. Thus, the structure of the solubilized polymers may be represented by the formula (4) 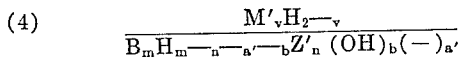

where $M'$, $v$, $Z'$, $(-)$, $m$ and $n$ are as previously defined; $a'$ represents the numeral 2; and $b$ represents a cardinal number of from 0 through 4, $a'+b$ being no greater than 6, and $a'+b+n$ being no greater than $m$.

In the solvolysis step, the process is most conveniently carried out at elevated temperatures (50°–150° C.) until the insoluble polymer has gone into solution. The now solubilized polymer can be isolated by conventional procedures, e.g., precipitation by formation of an insoluble salt. For instance, treatment of the reaction mixture with aqueous tetramethylammonium chloride causes the polymeric tetramethylammonium salt to precipitate from cold water.

The solubilized polymers represented by Formula 4 may be subjected to cation-exchange treatment, whereby the cation $M'$ may be replaced by any of a number of cations. The nature of the cation is unimportant, being employed merely to complete the valence charge of each anionic boron cage. The cation so substituted is designated by the symbol M; thus the formula of the polymers of this invention after cation-exchange may be depicted as (5) 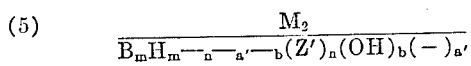

where M is one equivalent of a cation, and all other symbols are as previously defined.

M and $M'$ can represent any metal in the Periodic Table shown in Deming's "General Chemistry," Fifth Edition, page 156 (Wiley, 1944), i.e., a metal of Groups I-A, II-A, III-A, IV-A, V-A, VI-A, I-B, II-B, III-B, IV-B, V-B, VI-B, VII-B, or VIII. For example, M can be lithium, potassium, rubidium, cesium, beryllium, magnesium, calcium, barium, strontium, copper, mercury, aluminum, tin, bismuth, silver, zinc, vanadium, chromium, manganese, ruthenium, cobalt, nickel, or any other metal. Preferred metal cations are those having valences of 1, 2, or 3. Especially preferred metals, for reasons of availability, are those of Groups I-A and II-A, i.e., the alkali metals (most preferred) and alkaline-earth metals.

M can also be one equivalent of an organic or organo-inorganic cation, for example, an ammonium, phosphonium, or sulfonium cation of the formula $U_2U'NH^+$, $U_3U'N^+$, $U'_4P^+$, or $U'_3S^+$, where U is aliphatically saturated hydrocarbyl bonded to the nitrogen, phosphorus, or sulfur through aliphatic carbon, $U'$ is aliphatically saturated hydrocarbyl, and any two U and/or $U'$ groups can be joined together, directly or through an oxygen heteroatom, to form an alkylene or oxygen-interrupted alkylene radical. ("Alkylene" as used here refers to a divalent, saturated, aliphatic hydrocarbon radical, e.g., ethylene, —CH$_2$CH$_2$—.). Because of easier availability, cations in which U and $U'$ contain at most 12 carbons each and any alkylene group contains at most 12 carbons are preferred. Examples are triisopropylammonium, N-methylpiperidinium, N-hexylmorpholinium, pyridinium, trihexylammonium, diethyl - [2 - (β - naphthyl)ethyl]ammonium, N,N-dipropylanilinium, benzyltrimethylammonium, tetraisopentylammonium, didodecyldiethylammonium, butyldimethyl(phenyl)ammonium, 1,1-dimethyl- hexamethyleniminium, tetrabenzylphosphonium, ethyltriphenylphosphonium, tetramethylphosphonium, isobutylethylmethylpropylphosphonium, ethylpentamethylene-p-tolylphosphonium, tetra(α-naphthyl)phosphonium, triphenyl sulfonium, methyltetramethylenesulfonium, benzyldodecylmethylsulfonium, methyldipentylsulfonium, and trimethylsulfonium. An especially preferred group of cations of this type are those in which the U and/or $U'$ groups are the same and are lower alkyl, particularly the tetra(lower alkyl)ammonium cations.

As a further example, M can also be any of a very broad class of substituted ammonium od hydrazonium cations represented by the formulas $U'NH_3^+$, $UU'NH_2^+$, $U'N_2H_4^+$, $U'_2N_2H_3^+$, $U'_3N_2H_2^+$, and $UU'_3N_2H^+$, where U and $U'$ are as previously defined. Examples are methylammonium, cyclopropylammonium, 1-methylheptylammonium, 2-(1-naphthyl)-ethylammonium, diisobutylammonium, dicyclohexylammonium, dinonylammonium, morpholinium, dodecamethyleniminium, phenylhydrazonium, 1-methyl-1-phenylhydrazonium, 1-methyl-2-isopropylhydrazonium, dodecylhydrazonium, 1,1,2-triethylhydrazonium, 1,1,1-triheptylhydrazonium, tetramethylhydrazonium, and tetrabenzylhydrazonium.

M can also be hydrogen, ammonium or hydrazonium.

With some cations, including hydrogen, the polymers are frequently isolated as solvates, in which at least some of the solvated molecules may be associated with the cations. Typical donor molecules of this type, i.e., molecules that can associate with these cations, are water, alcohols, ethers, nitriles, carboxamides, and sulfoxides. By far the most common solvate molecule present in the polymers of the present invention is water. In some cases the coordination tendency of the hydrogen ions and of other types of cations is satisfied by donor atoms such as the oxygen of hydroxyl substituents, or the nitrogen of amino substituents, rather than by solvate molecules. The presence or absence of solvate molecules, and the degree of solvation when such molecules are present, is not critical and is of no particular importance to the present invention. It is to be understood, therefore, that the term "hydrogen," as used here, i.e., as a value of M and as H in the expression $M'_vH_{2-v}$ includes hydrogen ions solvated with molecules of the types discussed above. This usage of the term "hydrogen" is based on nomenclature apprived by the International Union of Pure and Applied Chemistry; see J. Am. Chem. Soc., 82, 5529–30 (1960). More broadly, it is to be understood that the polymers of the invention include solvated polymers generally, and particularly hydrated polymers.

M can also, for example, be a complex cation of any of the metals referred to above, e.g., tetramminecopper(II), tetramminezine (II), diaquotetramminechromium (III), tris(1,2-propanediamine)chromium(III), nitratopentamminecobalt(III), dichlorobisethylenediaminecobalt(III), dicyclopentadienyliron(III), dibenzenechromium(I), and tris(acetylacetonato)silicon.

Because of availability and desirable properties of the polymers containing them, the preferred types of cations of those described in the preceding four paragraphs are hydrogen, ammonium, (lower alkyl)ammonium, and di (lower alkyl)ammonium.

Overall, because of availability, cations having atomic or radical weights of at most about 300, and particularly those having atomic or radical weights of at most about 210, are preferred. Cations that are stable to water also constitute a preferred class, since many of the preparative methods and the procedures conveniently used in working with the polymers involve aqueous systems.

The solubilized polymers may also be treated with substitution reagents to replace any remaining B—H groups with B—Z groups. Thus, the final polymer can be one in which all the cage borons are attached either to linking oxygen bonds or to Z groups.

A multitude of Z groups can be introduced by conventional processes into the decoborate or dodecaborate cage of the recurring polymer unit by employing readily available reactants.

Preferably, Z is hydroxyl, halogen (i.e., chlorine, fluorine, bromine or iodine), carboxyl, amino, alkyl of up to 12 carbon atoms, alkoxy of up to 12 carbons, or alkylthio of up to 12 carbons. These Z groups are preferred because the initial boron reactant may contain them.

Hydrogen atoms attached to boron of the $B_{12}$ cages in polymers of Formulas 1, 3, 4, and 5, i.e., in both the primary and secondary (solubilized) polymers, can be replaced by Z groups through reactions of the polymers with electrophilic reagents. Additional values of Z can be realized in the polymers by chemical modification of groups already present (e.g., by reduction, esterification, hydrolysis, or amidation), regardless of the stage at which the group already present was introduced.

Substitution reactions of this type are described in detail for monomeric $B_{12}$ anions in assignee's copending application Ser. No. 246,636, filed Dec. 21, 1962 in the names of Henry C. Miller and Earl L. Muetterties, and for $B_{10}$ anions in Ser. No. 237,392, filed Nov. 13, 1962, by W. H. Knoth, Jr. The general principles and procedures discussed therein apply to the $B_{10}$ and $B_{12}$ anionic units in the polymers of the present invention. In addition, one skilled in the art will appreciate that in general, polymers tend to be less reactive than monomeric compounds having the same structure as the repeating units of the polymers, and therefore somewhat more stringent conditions may be required to effect a given reaction in a polymer of this invention than in a monomeric $B_{10}$ or $B_{12}$ cage compound.

Electrophilic reagents which are operable in the process of the invention are given below, together with the substituent group which in the process is bonded to boron in the final product.

| Electrophilic Reagent | Electrophilic Group Bonded to Boron |
|---|---|
| Halogens ($F_2$, $Cl_2$, $Br_2$, $I_2$) | Halogen (F, Cl, Br, I) |
| Cyanogen halides (CNF, CNCl) | Nitrile (CN) |
| Sulfuric Acid | —$SO_3H$ |
| Nitric Acid | —$NO_2$ |
| $H_2NOSO_3H$ | —$NH_2$ |
| Olefins | —Alkyl [e.g., —$C_2H_5$, —$CH(CH_3)_2$] |
| Acetylenes | Alkenyl (e.g., —CH=$CH_2$, —CH=CHR″) |
| Acyl Halides |  |
| $Hg(OCCH_3)_2$ | —$HgOCCH_3$ |
| $(CN)_2C=C(CN)_2$ | —(CN)C=C(CN)_2 |
| $HNO_2$ | —NO |
| CO/HCl | —CH=O |
| $RSO_2Cl$ | —$SO_2$—R |
| $(R_2NCCl)$ | —$CNR_2$ (=O) |
| (RORH)$^+$ Cl$^{-a}$ | —OR |
| (ROH_2)$^+$ Cl$^{-a}$ | —OH |
| ($H_3O$)$^+$ Cl$^{-b}$ | —OH |
| RSSR | —SR | a Oxonium salt.
b Hydronium salt.

In the above groups, R is a monovalent organic radical, preferably hydrocarbon of at most 18 carbons, which can be alkyl, alkenyl, cycloalkyl, cycloalkenyl, aryl, alkaryl, aralkyl, and the like.

In the reactions employing some of the above electrophilic reagents, a catalyst may be used, e.g., aluminum trichloride, boron trifluoride and polyphosphoric acid. These catalysts are employed in the same manner as in the well-known procedures in organic chemistry. In some cases the boron compounds themselves function as catalysts, e.g., in alkylation of a polymer in which all the cations are hydrogen.

Processes which are employed to introduce one or more Z groups on the boron cages of the polymers are not necessarily identical with the processes employed to introduce the Z groups on a benzene nucleus. Consideration must be given to differences in reactivity or in reaction mechanism between a completely inorganic system, as represented by the anions present in a polymer made from $B_{10}$ and $B_{12}$ cages and an organic aromatic system represented by the benzene ring.

It is further noted that in the introduction of Z groups by methods discussed above, the substituent which ultimately is bonded to boron in the final product is not necessarily the substituent which would be obtained with a process employing a conventional carbocyclic aromatic reactant. To illustrate, reaction of formaldehyde with a monomeric dodecahydrododecaborate yields a compound in which Z is —$OCH_3$ instead of —$CH_2OH$ which might be obtained. The same principle applies to polymers containing anionic decaborate and dodecaborate units. Variations of this nature from conventional results are, as mentioned earlier, not unexpected in view of the completely inorganic character of the $B_{10}$ and $B_{12}$ anionic units.

The following examples illustrate the polymers and processes of the invention:

Example 1

A. *Polymerization.*—A 5.07 g. sample of $$Na_2B_{12}H_{12} \cdot 0.9H_2O$$

was dehydrated by holding 16 hours at room temperature under an oil pump vacuum of 0.05 mm., then 3 hrs./200° C./.05 mm. vacuum. The anhydrous salt thus obtained was then heated under vacuum in an alundum boat in a tubular furnace to 650° C. during 30 min. and held 2 hrs./650° C./vacuum. Gas was evolved, and the vacuum rose to 4.1 mm., beginning at about 500° C. The gas evolution was essentially complete and vacuum fell to 0.3 mm. after 2 hrs. at 650° C. Some metallic mirror was formed at the cool ends of the tube. The grey solid residue weighed 4.53 g. It was extracted with 50 ml. of water, with which it reacted exothermically. (The water extract, combined with washings from the metallic mirror in the tube, neutralized 38.5 ml. of N/10 HCl. This is equivalent to 7.8% of the $Na^+$ initially present.)

The water-insoluble product (product A) was dried 16 hours at 25° C. in a vacuum. It was a brown powder, weighing 5.43 g. Analysis: Found: B, 62.95; Na, 15.4; H, 5.43; O (diff.), 16.22. The infrared (Nujol mull) had bands at 2.9μ (OH), 4.1μ (B—H), 6.25μ ($H_2O$), 9.1μ (B—OH), 9.6μ (B—B, cage), and 13.8μ (cage; tentative). The analysis corresponds to a crosslinked polymer in which divalently anionic dodecahedra are bonded to each other by direct B—B intercage bonds. The average recurring unit has the composition $Na_{1.4}B_{12}H_{11}O_2$, with 1.4 sodium cations and 0.6 hydrogen ion associated with the anionic $B_{12}$ cage, and the oxygen being present as water of hydration and as hydroxyl groups bonded to boron of the boron cage. The product was insoluble in dimethylformamide, toluene, chloroform, benzonitrile or tricresyl phosphate.

B. *Solvolysis and cation exchange.*—A 1-g. sample of a product prepared as in A above was suspended in 50 ml. of water and refluxed. It slowly dissolved during one hour. Addition of aqueous cesium hydroxide to the solution gave a gelatinous precipitate that was twice reprecipitated from water by adding ethanol to give a microcrystalline polymeric cesium salt that analyzed as follows: Cs, 47.4; B, 30.81; H, 3.34; O (diff.), 18.35. The infrared spectrum (Nujol mull) closely resembled that of product A above. The analysis corresponds to a non-cross-linked polymer in which divalently anionic dodecahedra are bonded to each other; each dodecahedron being bonded to an average of two others by direct B—B intercage bonds. The average recurring unit has the composition $Cs_{1.5}B_{12}H_{14}O_{4.8}$, with 1.5 cesium cations and 0.5 hydrogen ion associated with the anionic $B_{12}$ cage, and the oxygen being present as water of hydration and hydroxyl groups bonded to boron of the boron cage.

Another sample of product A was dissolved by refluxing in water, the solution was passed through a strongly acidic ion exchange resin, concentrated to about 10%, and aqueous tetramethylammonium chloride was added to give a white precipitate that was reprecipitated from water by adding ethanol. The product was a white solid, polymeric tetramethylammonium salt that analyzed as follows: B, 53.82; C, 17.88; H, 10.20; N, 5.34; O (diff.), 12.76. The infrared (Nujol mull) had bands at 2.8, 4.0, 4.4, 6.2, 6.8, 9.2, 10.0, 10.6 and 13.9μ. This product was soluble in dimethylformamide at room temperature to give a clear, fluid 10% solution. It was a polymer of the same general type as the polymeric cesium salt described above, except that the cations present in association with the $B_{12}$ anionic unit were two tetramethylammonium cations; the average recurring unit having the composition $[(CH_3)_4N]_2B_{12}H_{14}O_{1.9}$.

C. *Bromination, solvolysis, cation exchange, and dialysis.*—A 2.00 g. sample of product A was suspended in 100 ml. of acetonitrile, heated to reflux, and 30 g. of bromine was added dropwise during 1.5 hours. After 3 hrs. at reflux, the reaction slurry was evaporated under nitrogen on a steam bath, and the residue was dried under vacuum on the steam bath. The residue was taken up in water and a small (0.30 g.) water-insoluble fraction was discarded by filtration. Addition of 20% aqueous tetramethylammonium chloride to the filtrate gave a polymeric tetramethylammonium salt. This was heated in 100 ml. water until it dissolved (30 min.), precipitated by the addition of ethanol, and again reprecipitated from water by adding ethanol. The final product analyzed as follows: B, 14.92; Br, 64.86; C, 7.64; H, 3.02; N, 2.82; O (diff.), 6.64. The infrared (Nujol mull) had bands at 2.8, 6.2, 6.8, 9.0, 10.2, 10.5, 11.9 and 13.9μ. There was no absorption in the B—H region, which fact showed that all hydrogen bonded directly to boron had been replaced by bromine. The analysis corresponds to a polymer of the invention having an average recurring unit of the composition $[CH_3)_4N]_{1.5}B_{12}H_{4.5}Br_7O_{3.5}$, in which the anionic $B_{12}$ cage is associated with 1.5 tetramethylammonium cations and 0.5 hydrogen ion and the remaining hydrogen and the oxygen are present in the form of water of hydration and hydroxyl groups bonded to boron of the cage. The product was partly soluble in hot dimethylformamide and the solution could be cast on glass to give hard, smooth, adherent films.

A sample of the polymeric tetramethylammonium salt was dialyzed in cellophane against running tap water for four days. The porosity characteristics of the cellophane membrane were such that polymeric molecules having molecular weights above about 5000 could not pass through it. Remaining in the dialysis bag was 30% of the total sample.

D. *Dialysis and cation exchange.*—A 2 g. sample of product A was dissolved by refluxing in 100 ml. of water for one hour. The solution was filtered and the filtrate was dialyzed in cellophane (same porosity as in the preceding experiment) against running tap water for 20 hours. Half of the residue was evaporated to give 0.42 g. (42% of the initial) of a microcrystalline brown solid with an infrared like that of product A above, and an inherent viscosity (0.5% in water) of 0.08. The product was a high-molecular-weight fraction (>5000) of a polymer of the invention in which the anionic portion of the average recurring unit was of the same type as in the polymers of section B, above, and the cations were hydrogen ions.

The other half of the residue was passed through a strongly acidic ion exchange resin, neutralized with 26.4 ml. of N/10 NaOH and evaporated to give 0.36 g. of the clear brown sodium salt of the polymeric acid described above. It had a cryoscopic molecular weight (freezing point in water) of 386–401. Since the product is a polyelectrolyte, this value is indicative of high polymer. Light scattering indicated a molecular weight of 6494 (green) and 7783 (blue; fluorescent).

Other examples of the polymerization of polyhedral borane salts by heating under the procedures set forth in the above example are given in the accompanying table.

TABLE—HEATING POLYHEDRAL BORANE SALTS

| Ex. | Compound | Heating Cycle | Composition of Product [1] | Percent Sol. In— | | | Percent Not Dialyzable |
|-----|----------|---------------|---------------------------|---|---|---|-----|
| | | | | $H_2O$ at R.T. | Hot $H_2O$ | Hot Aq. NaOH | |
| II | $Na_2B_{12}H_{12}$ | 4 hrs./600°/air | $Na_{1.8}B_{12}H_{12}O_{3.2}$ | 34 | 73 | | 33 |
| III | $Na_2B_{12}H_{12}$ | 2 hrs./650°/$N_2$ | $Na_{1.8}B_{1.2}H_{13.9}O_{25}$ | ~5 | ~95 | | 38 |
| IV | $K_2B_{12}H_{12}$ | 2 hrs./650°/vac | $K_{1.8}B_{12}H_{3.9}O_{2.4}$ | 46 | 80–90 | | 54 |
| V | $Li_2B_{12}H_{12}$ | 2 hrs./650°/vac | $Li_2B_{12}H_{8.4}O_{2.5}$ | ~5 | 93 | | 53 |
| VI | $Cs_2B_{12}H_{12}$ | 1 hr./700°/vac | | 20 | | 28 | 5 |
| VII | $Na_2B_{10}H_{10}$ | 2 hrs./501–581°/vac | $Na_{1.2}B_{10}H_{14}O_{3.5}$ | ~5 | 100 | | 55 |
| VIII | $Na_2B_{12}H_9Br_3$ | 1 hr./600°/vac | | 56 | | 36 | 6 |
| IX | $Na_2B_{12}H_{8.1}Br_{3.9}$ | 1 hr./600–625°/vac | B.Br=12/3.7 | 49 | | | 11 |
| X | $Na_2B_{12}H_8F_4$ | 1 hr./600°/vac | B.F=12/3.4 | 14 | 13 | | 11 |
| XI | $K_2B_{12}H_{5.5}F_{6.5}$ | 1 hr./660–680°/vac | | 5 | | 23 | |
| XII | $Na_2B_{12}H_6Cl_6$ | 1 hr./590–633°/vac | B.Cl=12/6.5 | 95–100 | | | 8 |

[1] After washing with water.

In place of the monomers described in the foregoing examples, other monomers may be employed, such as, $Ti[B_{12}H_8(SCH_3)_2(OC_2H_5)_2]_2$; $CaB_{10}H_5I_3(COOH)_2$
$BaB_{12}H_8(C_2H_5)_2(OH)_2$; $MnB_{10}H_5Cl_5$
$Ag_2B_{12}H_{10}[CH(CH_3)_2]_2$; $SnB_{12}H_{11}C(CH_3)_3$
$CdB_{12}H_{11}SC_4H_9$; $Cs_2B_{10}H_8(OC_{10}H_{21})_2$
$NiB_{12}H_9Cl_2COOH$; $HgB_{10}H_8(OH)_2$; $Au_2B_{12}H_{10}(OH)_2$
$CaB_{10}H_8(COOH)_2$; $BaB_{12}H_{10}(COOH)_2$; $CuB_{12}H_8Cl_4$
$SrB_{12}H_{10}(CH_3)_2$; $Ag_2B_{12}H_{12}$, $CuB_{10}H_{10}$, $BaB_{10}H_{10}$
$Cs_2B_{12}H_{12}$, $HgB_{10}H_{10}$ and the like.

The $M'B_{10}H_{10}$ and $M'B_{12}H_{12}$ monomers used in the process of this invention may be prepared as described by E. L. Muetterties et al. in Inorganic Chemistry 3, 444, (1964).

Alternatively, the $M'B_{12}H_{12}$ monomers can be prepared by subjecting the $B_{12}H_{12}$= salts prepared by H. C. Miller et al., Jour. Am. Chem. Soc. 85, 3885 (1963) to metallic cation-exchange resins.

The halogenated $B_{10}$ and $B_{12}$ monomers may be prepared as described by W. H. Knoth et al. in Inorganic Chemistry, 3, 159 (1964).

Hydroxyl groups can be introduced indirectly into the $B_{10}$ nucleus as follows: $(NH_4)_2B_{10}H_{10}$ is reacted with an amide such as dimethylformamide, dimethylacetamide, or N-methylpyrrolidone in the presence of hydrogen chloride. The reaction is exothermic. After the heat of reaction has dissipated itself, the intermediate borane-amide adduct is reacted directly with hot aqueous sodium hydroxide to give the $B_{10}H_9OH^=$ anion. If the dihydroxylated, $B_{10}H_8(OH)_2^=$, anion is desired, the borane-amide reaction mixture is heated externally for an additional period before isolating the adduct for subsequent treatment with sodium hydroxide. $B_{10}$ anions containing both hydroxyl and halogen substituents are made by halogenating the hydroxylated anions. Specifically, the $$B_{10}Cl_8(OH)_2^=$$

anion is formed by acidifying the alkaline solution of $Na_2B_{10}H_8(OH)_2$ described above with HCl and passing chlorine through the acid solution at 50° C.

Hydroxyl substituents can be introduced into the $B_{12}H_{12}^=$ anion by essentially the methods described above for their introduction into the $B_{10}H_{10}^=$ anion, and also by other methods that are not described above. These processes are described in detail in Ser. No. 246,636 and in assignee's copending application Ser. No. 237,392, filed Nov. 13, 1962, in the name of Walter H. Knoth, Jr., as are the processes described in the following five paragraphs.

Carboxyl groups are introduced into the $B_{10}H_{10}^=$ anion by direct or indirect processes involving carbon monoxide. Direct reaction of a hydrate of $H_2B_{10}H_{10}$ with carbon monoxide at 130° C. and 1,000 atmospheres gives a solution containing $H_2B_{10}H_9COOH$, from which sparingly soluble salts such as $[(C_3H_7)_4N]_2B_{10}H_9COOH$ can be separated. To introduce more than one carboxyl group, $(NH_4)_2B_{10}H_{10}$ is first converted to the bisdiazonium compound $B_{10}H_8(N_2)_2$ by reaction with $NaNO_2/HCl$ in aqueous solution at 15° C. or lower, followed by reduction of the intermediate product (which is not isolated) with zinc and hydrochloric acid. The bisdiazonium compound is separated from the crude solid product by extraction with alcohol. Reaction of $B_{10}H_8(N_2)_2$ with carbon monoxide at 140° C. and 1,000 atmospheres, optionally in the presence of an inert diluent such as iron pentacarbonyl, gives $B_{10}H_8(CO)_2$, which on contact with water forms a hydrate of $H_2B_{10}H_8(COOH)_2$. The aqueous solutions that can be thus formed can be reacted directly with halogens to give the corresponding halogenated, carboxyl-containing $B_{10}$ anions.

Carboxyl groups are introduced into the $B_{12}H_{12}^=$ anion through reaction of a hydrate of $H_2B_{12}H_{12}$ with carbon monoxide at about 80° C. and 1,000 atmospheres. Sublimation of the crude product, or extraction thereof with benzene, yields the compound $B_{12}H_{10}(CO)_2$, which reacts readily with water to give a solution of $$H_2B_{12}H_{10}(COOH)_2$$

Extraction of the crude product with water and addition of cesium ion precipitates the cesium salt of the monocarboxylic acid, $Cs_2B_{12}H_{11}(COOH)$. The foregoing description shows, incidentally, how carbonyl groups are introduced into the $B_{12}$ nucleus.

Alkyl groups, R, can be introduced into the $B_{10}H_{10}^=$ ion by reacting a solvate, preferably a hydrate, of the acid $H_2B_{10}H_{10}$ with the corresponding olefins at 50–100° C. The boron-containing acid is strong enough to catalyze this alkylation process in the absence of any other catalyst. $B_{12}H_{12}^=$ may be similarly treated at from 0–80° C.

Alkoxy groups (OR) can be introduced into the $B_{10}H_{10}^=$ ion by reacting a solvate, preferably a hydrate, of the acid $H_2B_{10}H_{10}$ with the corresponding methyl ethers, $CH_3OQ''$ and $CH_3OQ_2'''$, at 30–80° C., and at 50–100° C. for $H_2B_{12}H_{12}$.

Alkylthio (SR) groups can be introduced into the $B_{10}H_{10}^=$ ion or $B_{12}H_{12}^=$ by reacting a solvate, preferably a hydrate, of the acid $H_2B_{10}H_{10}$ or $H_2B_{12}H_{12}$ with the corresponding disulfides RSSR, at ordinary temperatures.

Inert materials such as dyes, pigments, fillers, delusterants, plasticizers and antioxidants can be incorporated in the polymers. Polymers containing such additives are included in the products of this invention.

The solubilized polymers find utility as films for use in applications involving polymeric films, as protective coatings, fabric stiffeners, antistats and dyeing aids. The unsolubilized polymers find utility, as shown in the examples, in preparing the solubilized polymers. In addition, they may be employed as cation-exchange resins.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A boron containing polymer consisting essentially of recurring divalently anionic units selected from the class consisting of polyhedral dodecaborate cages, polyhedral decaborate cages, and mixtures thereof, each said recurring unit linked to from two to six, inclusive, other such recurring units through direct boron-boron bonds; the boron atoms of each said unit not bonded to another cage benig bonded to groups selected from the class consisting of —H, —OH, —COOH, halogen, amino, alkyl of up to 12 carbons, alkoxy of up to 12 carbons and alkylthio of up to 12 carbon atoms; the anionic charge on each unit being satisfied by a cationic moiety.

2. The polymer of claim 1 wherein the cation is an alkali metal.

3. The polymer of claim 1 wherein the cation is tetra-loweralkyl ammonium.

4. The polymer of claim 1 wherein each said recurring unit is linked to two other recurring units.

5. The polymer of claim 1 wherein at least one of the boron atoms of the recurring unit not bonded to another recurring unit is bonded to hydroxyl.

6. The polymer of claim 1 wherein all the boron atoms of the recurring unit not bonded to another recurring unit are bonded to hydrogen.

7. The polymer of claim 6 wherein the cation is tetra-loweralkyl ammonium.

8. The polymer of claim 6 wherein the cation is an alkali metal.

9. The polymer of claim 1 wherein the boron atoms of the recurring unit not bonded to another recurring unit are bonded to a group selected from the class consisting of hydrogen, chlorine, hydroxyl and mixtures thereof.

10. The polymer of claim 1 in the form of a film.

11. The polymer of claim 1 in which the molecular weight is at least 5,000.

12. The polymer of claim 11 in the form of a film.

13. A process for preparing an ionic polyhedral borate polymer which comprises heating, in an open system at a temperature of from about 350° to about 800° C., an anhydrous metal salt of a polyhedral borate selected from the group consisting of metal dodecaborates, metal decaborates, and mixtures thereof, said boron atoms of each polyhedral borate being bonded to a group selected from the class consisting of —H, —OH, —COOH, halogen, alkyl of up to 12 carbon atoms, amino, alkoxy of up to 12 carbon atoms and alkylthio containing up to 12 carbon atoms, until gaseous evolution is complete.

14. A process for preparing an ionic polydodecaborate polymer which comprises treating the polymer prepared in claim 13 with a solubilizing agent selected from the group consisting of water, aqueous solutions of inorganic bases, lower alkylamines, unsubstituted amides of formic acid and lower alkanoic acids, alkylamides and dialkylamides of formic acid and lower alkanoic acids, diloweralkyl sulfoxides, and aqueous mineral acids.

15. A process for preparing an ionic polyhedral borate polymer which comprises heating, in an open system at a temperature of from about 350° to about 800° C., an anhydrous metal salt of a polyhedral borate selected from the group consisting of metal dodecaborates, metal decaborates, and mixtures thereof, said boron atoms of each polyhedral borate being bonded to a group selected from the class consisting of —H, —OH, —COOH, halogen alkyl of up to 12 carbon atoms, alkoxy of up to 12 carbon atoms and alkylthio containing up to 12 carbon atoms, until gaseous evolution is complete; and treating the resulting polymer with a solubilizing agent selected from the group consisting of water, aqueous solutions of inorganic bases, lower alkylamines, unsubstituted amides of formic acid and lower alkanoic acids, alkylamides and dialkylamides of formic acid and lower alkanoic acids, diloweralkyl sulfoxides, and aqueous mineral acids.

No references cited.

WILLIAM H. SHORT, *Primary Examiner.*

M. GOLDSTEIN, *Assistant Examiner.*